(12) United States Patent
Wang

(10) Patent No.: US 7,025,378 B2
(45) Date of Patent: Apr. 11, 2006

(54) AIR BAG AND METHOD FOR MAKING AN AIR BAG

(75) Inventor: Yunzhang Wang, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 103 days.

(21) Appl. No.: 10/617,287

(22) Filed: Jul. 10, 2003

(65) Prior Publication Data

US 2005/0006882 A1    Jan. 13, 2005

(51) Int. Cl.
*B60R 21/16* (2006.01)

(52) U.S. Cl. ............... 280/730.2; 280/743.1; 280/743.2; 280/729

(58) Field of Classification Search ............ 280/730.2, 280/743.1, 743.2, 729, 730.1; 5/710, 720; 441/40, 129
See application file for complete search history.

(56) References Cited

U.S. PATENT DOCUMENTS

| 5,322,322 A | 6/1994 | Bark et al. |
| 5,480,181 A | 1/1996 | Bark et al. |
| 5,533,755 A | 7/1996 | Nelson et al. |
| 5,841,564 A | 11/1998 | McDunn et al. |
| 5,941,564 A | 8/1999 | Acker |
| 6,010,149 A | 1/2000 | Riedel et al. |
| 6,106,349 A * | 8/2000 | Motosko ............ 441/129 |
| 6,152,481 A * | 11/2000 | Webber et al. ......... 280/730.2 |
| 6,237,942 B1 | 5/2001 | Swann |
| 6,554,669 B1 * | 4/2003 | Motosko ............ 441/129 |
| 6,631,921 B1 * | 10/2003 | Drossler et al. ........ 280/730.2 |
| 2003/0184060 A1 * | 10/2003 | Smith et al. ........... 280/730.2 |

FOREIGN PATENT DOCUMENTS

EP        0 924 122 A1 *  6/1999

* cited by examiner

*Primary Examiner*—Ruth Ilan
(74) *Attorney, Agent, or Firm*—Terry T. Moyer

(57) ABSTRACT

An airbag formed to have a series of nodes therein, each node defined by pinching and jointing a portion of alternate opposing sides of a tubular structure so that each node lies generally in a plane at 90° (or near 90°) with respect to an adjacent node. The pinch points or joints are preferably short segments or small areas where the opposing sides are jointed by heat welding, sewing, ultrasonic welding, by adhesives, or by weaving.

6 Claims, 3 Drawing Sheets

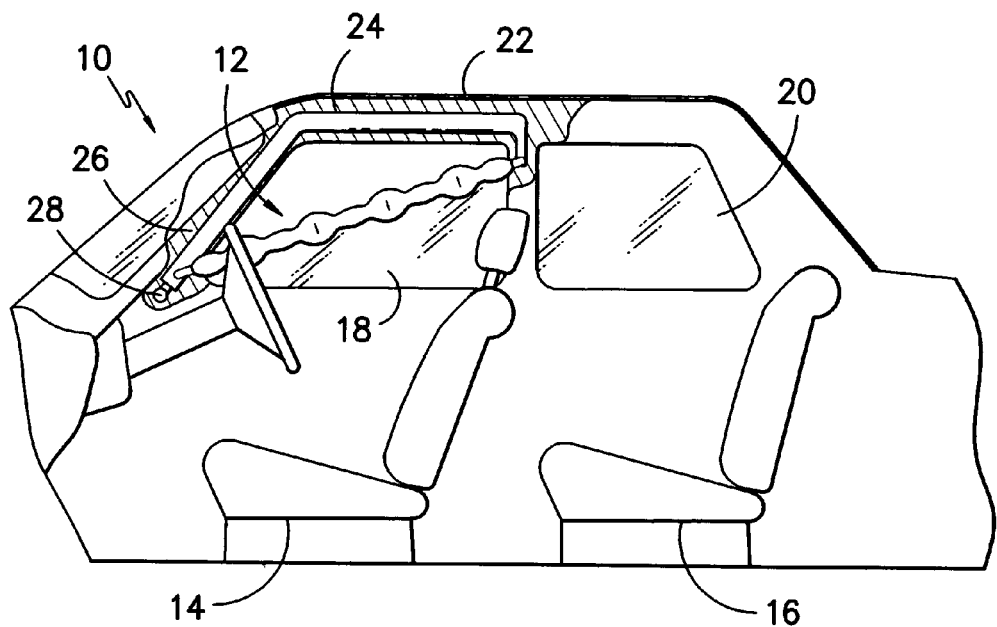
FIG. -1-
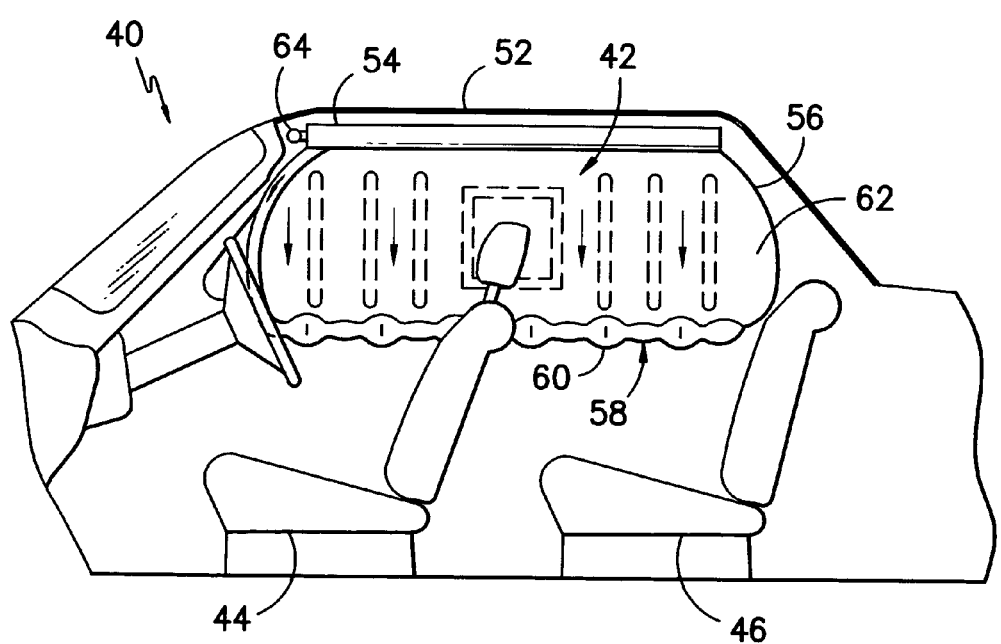
FIG. -2-

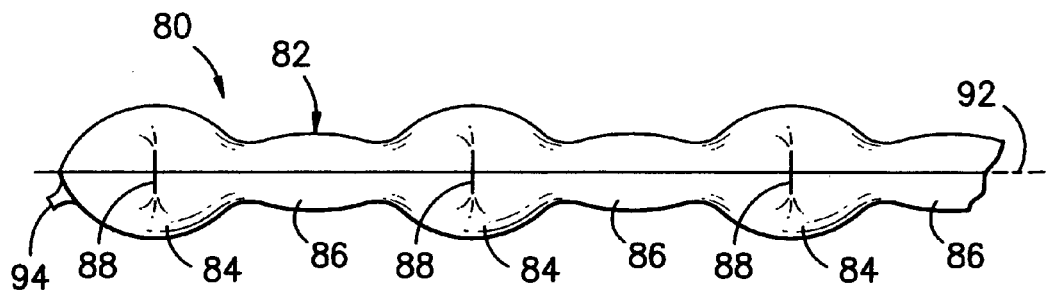
FIG. -3-
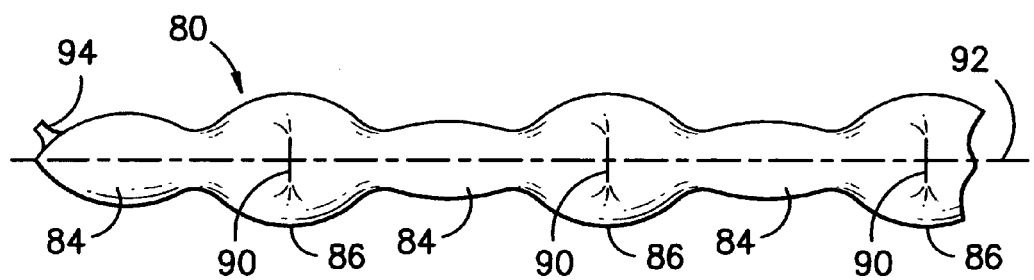
FIG. -4-
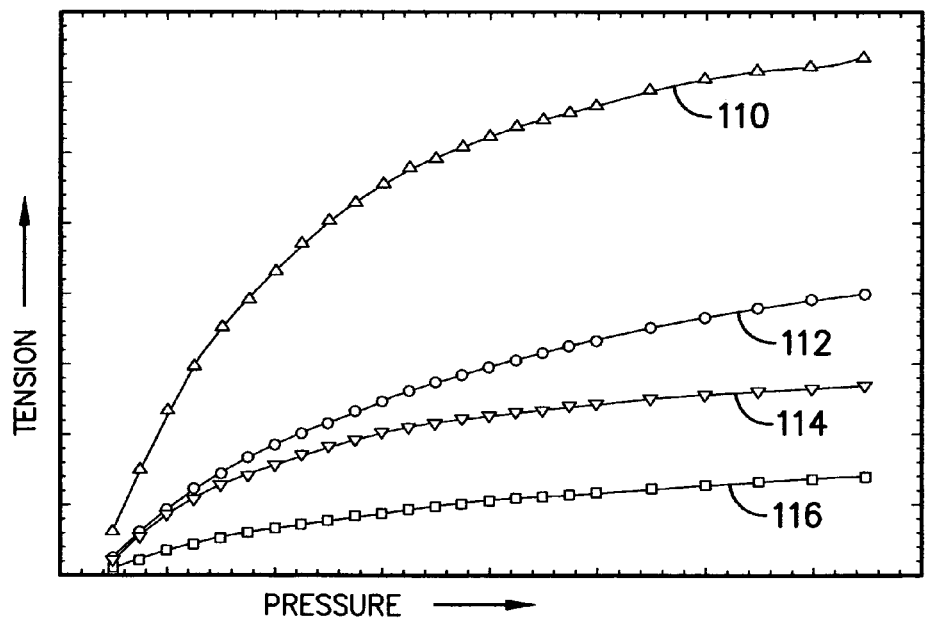
FIG. -6-

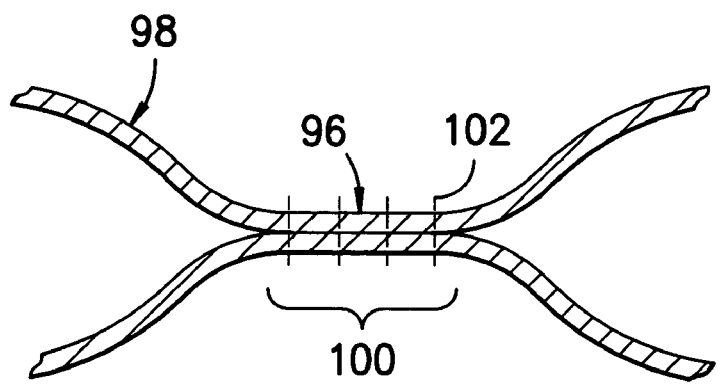
FIG. -5A-
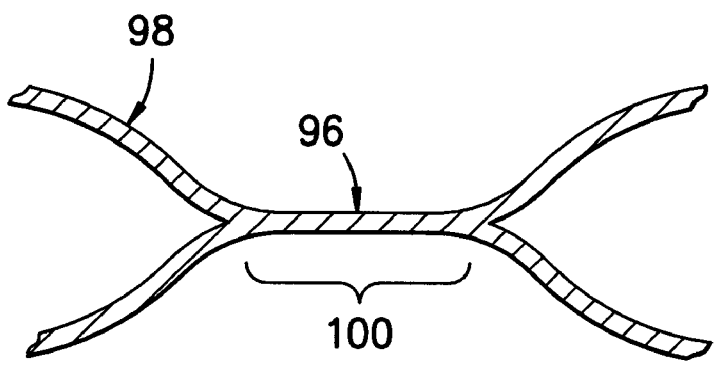
FIG. -5B-
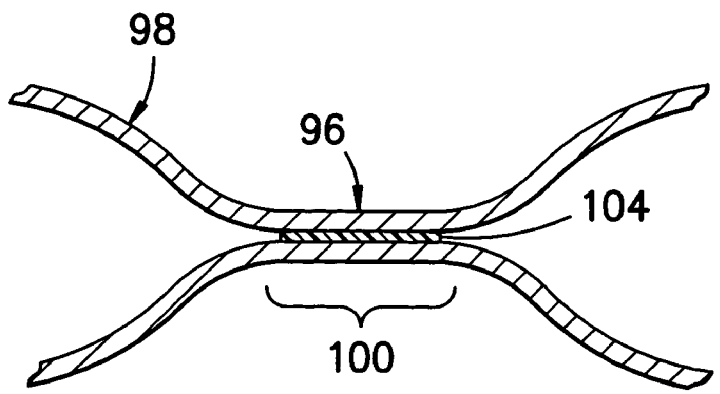
FIG. -5C-

AIR BAG AND METHOD FOR MAKING AN AIR BAG

BACKGROUND OF THE INVENTION

The present invention relates to inflatable protective cushions, and more specifically relates to cushions formed to contract along a major axis upon inflation. This type of cushion is particularly useful in side protection of occupants in a transportation vehicle, such as an automobile. A process for forming the cushion in an optimum shape according to the present invention is also provided.

Inflatable protective cushions used in passenger vehicles are part of a relatively complex passive restraint system. The main elements of this system are: an impact sensing system, an ignition system, a propellant, an attachment device, a system enclosure, and an inflatable protective cushion. When the impact sensing system senses an impact, the propellant is ignited by the ignition system causing an explosive release of gases that inflate the protective cushion, driving it from the system enclosure to a deployed state proximate to the vehicle occupant where it can absorb the impact of the movement of the occupant against it and dissipate its energy by means of rapid venting of the gas. The entire sequence of events from sensing the impact to deflation occurs within about 30 milliseconds.

A typical construction material for airbags has been a polyester or nylon fabric, coated with an elastomer such as neoprene, or silicone. The fabric used in bags is typically a woven fabric formed from synthetic yarn by weaving practices that are well known in the art. The inflation medium is generally a nitrogen or helium gas generated from a gas generator or inflator. Gas is conveyed into the cushion at a relatively warm temperature. The coating obstructs the permeation of the fabric by the gas, thereby permitting the cushion to rapidly inflate without undue decompression during a collision event. In the un-deployed state, the cushion is most commonly stored in or near the steering column, the dashboard, in a door panel, or in the back of a front seat placing the cushion in close proximity to the person or object it is to protect.

The use of a coating material for the airbag fabric has found acceptance because it acts as an impermeable barrier to the inflation medium. Airbags may also be formed from uncoated fabric that has been woven in a manner that creates a product possessing low permeability or from fabric that has undergone treatment such as calendaring to reduce permeability.

Silicone coatings typically utilize either solvent based or complex two component reaction systems. Dry coating weights for silicone have been in the range of about 3 to 4 ounces per square yard or greater for both the front and back panels of side curtain airbags. The majority of commercially used restraint cushions are formed of woven fabric materials utilizing multifilament synthetic yarns of materials such as polyester, nylon 6 or nylon 6,6 polymers.

The driver-side airbags are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference. However, inflatable cushions for use in the protection of passengers against frontal or side impacts must generally have a more complex configuration since the position of a passenger may not be well-defined and a greater distance may exist between the passenger and the surface of the vehicle against which that passenger might be thrown in the event of a collision.

As eluded to above, in addition to driver-side and passenger-side airbags, there are side impact airbags and side curtain airbags. Side impact airbags are linear, inflatable tubular structures; side curtain airbags are panel-like inflatable structures that cover a larger area. These both have been designed primarily to protect passengers during side crashes and to provide rollover protection, unrolling from a packed condition in enclosures within the roofline along the side windows of an automobile.

Side impact airbags provide cushioning effects from impact of the head of the passenger when the vehicle in which the passenger is riding is struck from the side. Side curtain airbags not only provide cushioning effects but also provide protection from broken glass and other debris. Both types of airbags provide restraint in addition to cushioning effects during rollover or when the windows of the vehicle are open. As such, it is imperative that side curtain airbags, as noted above, retain large amounts of gas, as well as high gas pressures, to remain inflated throughout the longer time periods of the entire potential rollover situation. To accomplish this, these side curtains are generally coated with very large amounts of sealing materials on both the front and back. Since most side curtain airbag fabrics comprise woven blanks that are either sewn, sealed, or integrally woven together, discrete areas of potentially high leakage of gas are prevalent, particularly at and around the seams.

In addition to the duration of air retention, side impact airbags and side curtain airbags must be able to contract upon inflation to achieve a high degree of tension to restrain vehicle occupants against the lateral forces on the vehicle. Ideally, this tension should be as high as possible, and, moreover, be sufficiently high with relatively low amounts of air in the airbag so that, even while still inflating, they provide restraint against lateral forces.

Several different inflatable tubular structures have been described in the prior art. For example, U.S. Pat. No. 5,480,181, issued to Bark et al., and U.S. Pat. No. 5,322,322, issued to Bark, both describe a braided tube with an inner bladder. U.S. Pat. No. 6,237,942 issued to Swann, describes a tubular structure with longitudinal slits and in inner bladder. Both of these structures achieve a contraction in the longitudinal direction by expanding in the lateral direction upon inflation. U.S. Pat. No. 5,841,564 issued to McDunn et al, describes a tubular structure with constricting elements to restrict the expansion of the tube. Upon inflation, the tubular structure forms a shape that resembles a string of beads as it contracts. Another technique that is used to achieve contraction upon inflation is to use a series of parallel cylindrical chambers. These tubular structures are also used to tension side curtain airbags. However, there still remains a need to increase tension of side impact and side curtain airbags especially at low volumes.

SUMMARY OF THE INVENTION

In view of the foregoing, it is an object of the invention to provide an air bag structure for use as a side impact airbag and as the bottom edge of a side curtain airbag that has high tension upon inflation and especially at lower air volumes during inflation. The present airbag structure achieves this object by its shape. Specifically, it is an inflatable tubular structure having a series of pinch points along its major axis, each successive pinch point being rotated 90° clockwise or counterclockwise about its major axis from the preceding pinch point so that the final structure defines a series of nodes alternating at right angles to each other.

One feature of the present invention are the series of rotated pinch points. These pinch points are formed by attaching opposing sides of the otherwise tubular fabric together at "points" along the length of the tubular structure. The "points" are preferably small areas or short segments. Not wishing to be bound by theory, it is believed that the intrinsically 3-dimensional shape created by these pinch points upon inflation achieves a relatively high surface area to volume ratio while still preserving a nearly "full diameter" bulk needed for effective cushioning. The intrinsically 3-dimension shape results in relatively greater degree of inflation of the present airbag structure on relatively lower amount of gas. The result is higher tension early in the inflation process, higher tension at the completion of the inflation process and higher tension upon gradual deflation.

An important advantage of the present invention is that it can be adapted for both use in side impact airbags and side curtain airbags. The airbag structure can serve as a side impact airbag directly and as the bottom edge of a side curtain airbag without significant modification of the side curtain panel.

Still another advantage of the present invention is that the present air bag structure does not require a radical departure from the starting structure for current inflatable tubular structures used for airbags. Rather, it is readily achievable by making a simple series of pinch points in a tube of airbag material. Implementing the present invention, as a result, is simplified and requires no change in the airbag enclosure or in the airbag material composition or treatment.

Additional features and their advantages of the invention will be set forth in part in the description which follows, and in part will be obvious from the description, or may be learned by practice of the invention. The features and advantages of the invention will be realized and attained by means of the elements and combinations particularly pointed out in the written description and claims as well as the appended drawings.

It is to be understood that both the foregoing general description and the following detailed description are exemplary and explanatory only and are not restrictive of the invention, as claimed.

BRIEF DESCRIPTION OF THE DRAWINGS

The accompanying drawings which are incorporated in and constitute a part of this specification, serve to illustrate several preferred embodiments and practices according to the present invention and together with the description, serve to explain the principles of the invention wherein:

FIG. 1 is a view of the interior of the side of a passenger vehicle with a deployed, inflated side impact cushion, according to a preferred embodiment of the present invention.

FIG. 2 is a view of the interior of the side of a passenger vehicle with a deployed, inflated side curtain cushion, according to a preferred embodiment of the present invention.

FIG. 3 is a top view of an inflatable tubular structure for use as an inflatable cushion in a side impact cushion or side curtain cushion, according to a preferred embodiment of the present invention.

FIG. 4 is a side view of the inflatable tubular structure shown in FIG. 3.

FIGS. 5A, 5B and 5C illustrate detailed views of a pinch point made by sewing, weaving and gluing, respectively, according to a preferred embodiment of the present invention.

FIG. 6 is a graph comparing the tension provided by the present inflatable tubular structure at different air pressures compared to other inflatable tubular structures.

DESCRIPTION OF EMBODIMENTS

Reference will now be made in detail to potentially preferred embodiments and practices. It is, however, to be understood that reference to any such embodiments and practices is in no way intended to limit the invention thereto. On the contrary, it is intended by the applicants to cover all alternatives, modifications and equivalents as may be included within the spirit and scope of the invention as defined by the appended claims The term "airbag" will refer generally to a cushion inflated with a gas, whether the gas is air, nitrogen, helium or other inflation medium. The present invention relates to an inflatable airbag structure usable as a side impact airbag or side curtain airbag and characterized by a different shape that generates higher tension on inflation than other inflatable airbag structures, rather than relating to the fabric of airbags, their method of deployment, their enclosure and the method for packing the airbag in the enclosure.

An embodiment of an airbag according to the present invention for use in a vehicle is illustrated in FIG. 1, and an alternative but also preferred embodiment of an airbag according to the present invention for use in a vehicle is illustrated in FIG. 2. As depicted in FIG. 1, an interior of a vehicle 10 after inflation of a side impact airbag 12 is shown. The vehicle 10 includes a front seat 14 and a back seat 16, a front-side window 18 and a back-side window 20, a roofline 22, within which is stored an elongated enclosure 24. Roofline 22 includes the so-called "A" pillar 26 that supports the roof toward the front of vehicle 10. Airbag 12 is stored in elongate enclosure 24 prior to deployment. Also present within roofline 22 is an inflator assembly 28 that ignites and forces gas into side curtain airbag 12 in the event of a collision.

FIG. 2 illustrates a similar vehicle 40 equipped with a side curtain airbag 42. Vehicle 40, much like vehicle 10, has a front seat 44, a back seat 46, a front-side window (covered by side curtain airbag 42), a back-side window (covered by side curtain airbag 42), a roofline 52, within which is stored an elongated enclosure 54. Airbag 42 is stored in elongated enclosure 54. Side curtain airbag 42 has a panel 56 with a bottom edge 58 carrying an inflatable tubular structure 60 similar in construction and operation to side impact airbag 12. Panel 56 has several passages 62 for receiving an inflation gas. An inflator assembly carried by panel 56 is used to fill passages 62 with the inflation gas.

When tubular structure 60 is incorporated into a side curtain 42 as shown in FIG. 2, it will be incorporated along bottom edge 58 of curtain 42. Either tubular structure 60 will carry its own inflation assembly 64 or it will receive gas from panel 56. Preferably tubular structure 60 will be preferentially filled over passages 62 and its interior will be in fluid communication with passages 62; most preferably, it will have its own nozzle (not shown).

The present airbag deploys either as a side impact airbag 12 or as a side curtain airbag 42 in the same manner as conventional side impact and side curtain airbags. It is made of the same types of materials. Its difference is in the manner in which it is formed.

Referring now to FIGS. 3 and 4, there is show a top and side view of the present airbag, generally indicated by the reference number 80. Airbag 80 is a generally closed tubular structure 82 having plural nodes 84 formed therein. Tubular structure 82 can be formed by combining two panels of fabric or by folding a single panel of fabric and jointing the longitudinal edges at a seam, or by weaving a cylindrical fabric. Each node 84 has an adjacent node 86 next to it. Each node 84 is formed by pinching or jointing together a portion of the opposing sides of tubular structure 82, forming a joint 88. A "joint" is the place where two fabrics are jointed together. The joint is made by pinching two points of the fabric of tubular structure 62 together. Node 84 has joint 88; adjacent node 86 has a joint 90. Joint 88 is oriented at an angle with respect to joint 90 defined by a rotation of the location of joint 90 with respect to joint 88 about the longitudinal axis 92 of tubular structure 82. Preferably the angle between node 88 and adjacent node 90 is 90° in either the clockwise or counter-clockwise direction. Each node 88, 90, can then be said to lie in a plane defined by the normal to the joint. A filled nozzle 84 is also carried by tubular structure 82 to permit airbag 80 to be inflated and deflated.

In one embodiment joints 88 and 90 are preferably spaced apart by approximately equal distances. The node separation distance is approximately the diameter of tubular structure 82. For example, if tubular structure 82 has a flat or inflated diameter of six inches, each node is preferably about six inches apart (12 inches for same-plane nodes).

Preferably, joints 88 and 90 are made by pinching diametrically opposing portions of the sides of tubular structure 82, as illustrated in FIGS. 5A–5C (where equivalent components are identified using the same reference number). A joint 96 can be made in a variety of ways and may preferably be made in more than one way on each tubular structure 98. For example, joint 96 can be made by sewing with thread 102 a small segment 100 of opposing sides of tubular structure 98 together, as illustrated in FIG. 5A. In other embodiments, the segments may be provided in multiple parts or segments, rather than in a single segment 100 as shown in the FIGS. 5A–5C. Joint 96 can be an integral part of the structure, made by heat welding or ultrasonic welding or by weaving the opposing sides of tubular structure 98, as illustrated in FIG. 5B. Joint 96 can be made by using an adhesive 104 to glue opposing sides of tubular structure 78 together, as illustrated in FIG. 5C. All of these techniques are well known. In a preferred embodiment, alternating joints 96 are made by weaving (such as Jacquard weaving) and the remaining joints 96 are made by heat welding or ultrasonic welding the fabric of tubular structure 98; or by sewing. One method would employ Jacquard weaves on every other segment, with sewn segments on alternating segments.

Preferably the portion of the opposing sides of tubular structure 98 that is pinched together to make joint 96 is small, preferably a short segment or small area only large enough to securely hold the two sides together firmly during inflation and use, but preferably not larger than approximately 40% of the diameter of tubular structure 98.

FIG. 6 illustrates graphically the advantage of the present shape in achieving contraction at minimal gas pressures on inflation. In the illustrated graph, tension (in pounds) is plotted versus pressure (in pounds per square inch) as measured under several different conditions. Data curve 110 illustrates the increase in inline tension of an airbag made according to the present invention. Data curve 112 illustrates the increase in inline tension of an airbag made by forming a series of vertical cylinders. Data curve 114 illustrates the increase in perpendicular tension of an airbag made according to the present invention. Finally, data curve 116 illustrates the increase in perpendicular tension made of an airbag made of a series of vertical cylinders. It will be readily appreciated that the tension provided by the present design, both perpendicular and inline, is significantly greater at higher pressure than the tension provided by the vertical cylindrical design. However, more significantly, the tension of an airbag according to the present invention is higher at low pressure and is rising at a faster rate at low pressures, approaching its equilibrium much earlier than the more linear increase in tension of the alternative design.

Those skilled in the art of airbag design for passenger restraints will appreciate that many substitutions and modifications may be made to the preferred embodiments described herein without departing from the spirit and scope of the present invention, which is defined by the appended claims.

What is claimed is:

1. An airbag, comprising:
   a side curtain having a bottom edge and passages formed therein;
   a tubular structure carried by said bottom edge of said side curtain and having plural nodes formed therein, each node of said plural nodes having an adjacent node and being formed by jointing together a portion of opposing sides of said tubular structure to form a joint, the respective joint of each node being oriented at an angle with respect to the respective joint of its adjacent node, said angle being defined by the relative rotation of the location of each joint about a longitudinal axis of the tubular structure; and
   a nozzle for receiving gas in said passages of said side curtain and in said tubular structure.

2. The airbag as recited in claim 1, wherein said tubular structure and said side curtain are in fluid communication with each other.

3. The airbag as recited in claim 1, wherein said nozzle means further comprises a first nozzle carried by said side curtain and a second nozzle carried by said tubular structure.

4. The airbag as recited in claim 1, wherein said angle is approximately 90°.

5. The airbag as recited in claim 1, wherein said tubular structure has a diameter and wherein said portion is a segment not more than about 40% of said diameter in length.

6. The airbag as recited in claim 1, wherein said each joint is formed by a method selected from the group consisting of weaving, welding, sewing, adhering and combinations thereof.

* * * * *